US012122604B1

(12) United States Patent
Terzini

(10) Patent No.: US 12,122,604 B1
(45) Date of Patent: Oct. 22, 2024

(54) ORDER-FULFILLMENT AND PRODUCT-HANDLING SYSTEM WITH RANDOM ITEM INDUCTION AND COLLATION

(71) Applicant: Tension International, Inc., Kansas City, MO (US)

(72) Inventor: Robert Terzini, Corinth, TX (US)

(73) Assignee: Tension International, Inc.

( * ) Notice: Subject to any disclaimer, the term of this patent is extended or adjusted under 35 U.S.C. 154(b) by 765 days.

(21) Appl. No.: 17/375,799

(22) Filed: Jul. 14, 2021

Related U.S. Application Data

(60) Provisional application No. 63/051,574, filed on Jul. 14, 2020.

(51) Int. Cl.
*B65G 1/12* (2006.01)
*B65G 1/137* (2006.01)
*G06Q 10/087* (2023.01)

(52) U.S. Cl.
CPC ......... *B65G 1/1376* (2013.01); *B65G 1/1371* (2013.01); *B65G 1/1378* (2013.01); *G06Q 10/087* (2013.01); *B65G 2209/02* (2013.01); *B65G 2209/04* (2013.01)

(58) Field of Classification Search
CPC ...... B65G 1/12; B65G 1/1376; B65G 1/1371; B65G 1/1378; B65G 2209/02; B65G 2209/04; G06Q 10/087
See application file for complete search history.

(56) References Cited

U.S. PATENT DOCUMENTS

| 7,918,402 | B2 | 4/2011 | Conlon et al. | |
| 8,494,673 | B2 * | 7/2013 | Miranda | B65G 1/1378 700/214 |
| 8,612,050 | B2 * | 12/2013 | Lee | B65G 47/31 700/226 |
| 9,126,768 | B2 * | 9/2015 | Devaux | B65G 17/323 |
| 9,665,688 | B2 * | 5/2017 | Terzini | G16H 20/13 |
| 10,618,742 | B2 * | 4/2020 | Wahren | B65G 43/10 |
| 10,669,098 | B1 | 6/2020 | Terzini et al. | |
| 11,345,547 | B1 | 5/2022 | Terzini et al. | |
| 11,548,037 | B1 * | 1/2023 | Hoffman | B65G 47/261 |
| 2011/0146835 | A1 | 6/2011 | Terzini | |
| 2013/0313071 | A1 * | 11/2013 | Kasuya | H01L 21/6773 198/375 |

(Continued)

*Primary Examiner* — Patrick H Mackey
(74) *Attorney, Agent, or Firm* — AVEK IP, LLC; Kent R. Erickson

(57) ABSTRACT

Systems and methods for order fulfilment and product handling are described. The system includes an application configured to identify products included in an order from a pharmacy to a wholesaler that can be bundled based on one or more criteria. Those products are retrieved from stock by the wholesaler and packaged together for shipment to the pharmacy. Operators at the pharmacy directly induct the bundled products into a product-handling system which accumulates and collates the products and other non-bundled products with respect to a patient order. The product-handling system may apply labels to the products and places the products associated with the patient order into a single package for shipment to the patient. The bundled products are directly inducted into the product-handling system without being placed in stock at the pharmacy.

20 Claims, 5 Drawing Sheets

(56) References Cited

U.S. PATENT DOCUMENTS

| | | | |
|---|---|---|---|
| 2016/0052716 A1* | 2/2016 | Schnabl | B65G 1/065 |
| | | | 414/273 |
| 2019/0367199 A1* | 12/2019 | Gehin | B65B 35/36 |
| 2020/0005384 A1* | 1/2020 | O'Neil | G06Q 30/0635 |
| 2022/0119206 A1* | 4/2022 | Bonnain | B65B 57/10 |

* cited by examiner

ORDER-FULFILLMENT AND PRODUCT-HANDLING SYSTEM WITH RANDOM ITEM INDUCTION AND COLLATION

CROSS-REFERENCE TO RELATED APPLICATIONS

This application claims the benefit of U.S. Provisional Patent Application No. 63/051,574, filed Jul. 14, 2020, the disclosure of which is hereby incorporated herein in its entirety by reference.

BACKGROUND

Longer onboarding and training, rising benefit and compensation rates, and shortages in labor are driving more and more warehousing, distribution, and fulfillment facilities to invest in automated solutions for operations. As the technologies improve and the applications become wider and more flexible, robotics are being adopted by a greater number of warehouse operations throughout the world.

Companies have found that the lower cost of capital, faster return on investment, and modularity of automation through robotics offers a renewed opportunity to make incremental investments that can be recouped in a reasonable amount of time. In addition, companies can buy what they need as volumes dictate and build out capabilities as needed, as opposed to making significant upfront capital investments. Modularity of robotic systems is a key selling point for automation manufacturers.

In many current order fulfillment scenarios, such as for pharmaceuticals and over the counter (OTC) products, orders are placed by a pharmacy with a wholesaler for items that are needed in stock at the pharmacy. Such orders are typically based on the pharmacy's in-stock supplies and predicted future needs. The wholesalers pick pharmaceutical and OTC products by cases and/or partial cases from pallet racks and as loose product from storage systems depending on the quantities ordered. The products are then packaged, palletized, and delivered to the pharmacy. For example, one current exemplary process for transferring product from wholesaler to a pharmacy begins with the wholesaler receiving a bulk order from the pharmacy. The required products are picked, packed, and shipped to the pharmacy. Operators at the pharmacy then confirm that the received products match the identities and quantities ordered. The operators are directed via an application to scan and put away the products in designated storage locations. Later, as the pharmacy receives orders from customers/patients, operators are directed via an application to select and scan items from storage location and replenish work cells or automation. Orders for the products can then be dispensed, verified, and packaged via manual and automated means.

Such systems require the pharmacy to maintain large warehousing spaces and large numbers of different products and quantities of those products on the shelves. These systems also make changing or expanding a selection of products in inventory difficult because of warehouse space limitations, expenses associated with expanding automation, and excess product remaining in inventory. Additionally, for many products, especially pharmaceuticals and OTC medications, there is a limited time available for those products to sit on the warehouse shelves before they expire or become unsaleable.

What is needed is a packaging system that can eliminate time- and personnel-consuming tasks of current product distribution and order fulfillment systems. Such a system that is easily expandable and adaptable to existing infrastructure and that can reduce warehousing needs would also be beneficial.

SUMMARY

Exemplary embodiments are defined by the claims below, not this summary. A high-level overview of various aspects thereof is provided here to introduce a selection of concepts that are further described in the Detailed-Description section below. This summary is not intended to identify key features or essential features of the claimed subject matter, nor is it intended to be used in isolation to determine the scope of the claimed subject matter. In brief, this disclosure describes order-fulfilment and product-handling systems and methods that employ order bundling to reduce fulfilment steps and warehousing needs and that can receive and collate randomly inducted items for labeling and packaging.

In one embodiment, the system includes a software application(s) distributed across a supply chain, such as a pharmacy and a wholesaler or distributor, and a product handling system at the pharmacy. The software application is configured to intake product orders from the pharmacy for items to be fulfilled by the wholesaler. From the orders, the application identifies bundle-order products and bulk-order products. Bundle-order products include various products within the order that can be grouped together based on, for example, groupings thereof that are associated with specific orders from patients that are received by the pharmacy. Bulk-order products may include products ordered by the pharmacy for stocking or forecasted needs and not associated with a particular patient order. Bundle-order product versus bulk-order product identification may also be based on other factors including available product and product handing capabilities of the pharmacy and/or wholesaler, among others.

At the wholesaler, the bundle-order products are collected and packaged together. Appropriate labeling is added to the products and/or their packaging that provides identification of the contents. The labeling is preferably a scannable indicia such as a barcode or a quick-read (QR) code and may be generated by the software application. The bulk-order products may be collected and shipped by known means.

Upon receipt by the pharmacy of the bundle-order products, an operator verifies the contents with the software application and inducts the products directly into a conveyance system. The conveyance system preferably comprises a linear synchronous motor technology that includes a plurality of independently controllable and moveable carriers. Each product piece is placed on and associated with a respective carrier. The conveyance system includes one or more order accumulation loops within which the carriers may be moved and collated or organized into groupings relative to an order placed with the pharmacy by a patient.

Upon collation or accumulation of all items in the patient order, the carriers for those items may be moved to a label applicator loop in which appropriate labeling may be added to each item. The now labeled items may next be moved to a packaging loop portion of the conveyance system and manually or automatically packaged for shipping to the patient. Accordingly, stocking and warehousing tasks and needs for the bundle-order products at the pharmacy are reduced or eliminated. The bundle-order products are never shelved or placed into storage at the pharmacy. In some embodiments, the conveyance system may be mated with or added on to existing product handling lines at a pharmacy to receive bulk-order and other products. Upon receipt of such bulk-order and other products by the conveyance system, those products may be incorporated with the bundle-products and handled in a similar manner, i.e. labeled and accumulated, and packaged.

In one embodiment, a product conveyance system is described. The conveyance system includes a plurality of bundle-order products and a conveyance system with an induction station, a carrier loop, and a packaging station. The plurality of bundle-order products are placed in a shipping packaging by a distributor prior to shipping. The bundle-order products are associated with a plurality of orders from end-users and each order of the plurality is associated with one or more of the plurality of bundle-order products. The conveyance system includes a track and a plurality of product carriers. Each product carrier is configured to carry one of the bundle-order products and is independently traceable and moveable along the track. The induction station is located along the track. The plurality of bundle-order products are received at the induction station in the shipping packaging. The bundle-order products are removed from the shipping packaging at the induction station and disposed directly onto and associated with a respective one of the plurality of product carriers. The carrier loop comprises a loop in the track into which one or more of the plurality of product carriers is moveable to group carriers carrying bundle-order products associated with a particular one of the plurality of customer orders together along the track. The packaging station is disposed along the track and includes an escapement via which the bundle-order products associated with the particular one of the plurality of orders are removed from their respective carriers and disposed into an order packaging for shipment to the end-user.

In another embodiment, a method for product handling is described. The method includes receiving an order from an end-user for a plurality of products and combining the order with a plurality of other orders from other end-users that include at least one of the plurality of products. The at least one of the plurality of products is designated as a bundle-order product. The combined order is transmitted to a distributor. A shipping package is received from the distributor and includes a number of the bundle-order products sufficient to fulfill requirements for the bundle-order products in the combined order. The bundle-order products from the shipping package are inducted into a conveyance system where each of the bundle-order products is disposed on a respective carrier that is independently moveable and traceable along a track of the conveyance system. The conveyance system groups one or more of the bundle-order products together based on the order for the plurality of products and the one or more bundle-order products are transferred to an order packaging, such as a poly-bubble bag or a box, via an escapement disposed along the track of the conveyance system.

In another embodiment, a method for receiving and packaging pharmaceuticals is described. By the method, an order is received at a pharmacy from a patient for a plurality of products, at least one of the products being a unit-of-use product. The order is combined with a plurality of other orders from other patients of the pharmacy that include the unit-of-use product which is now referred to as a bundle-order product. A combined order, including the order and the plurality of other orders, is transmitted to a distributor. A shipping package is received from the distributor and includes a number of the bundle-order products sufficient to fulfill requirements for the bundle-order products in the combined order. The bundle-order products from the shipping package are inducted into a conveyance system where each of the bundle-order products is disposed on a respective carrier that is independently moveable and traceable along a track. One or more carrier loops in the conveyance system are employed to group one or more bundle-order products together based on the order for the plurality of products. The one or more bundle-order products for the order are transferred into an order packaging via an escapement disposed along the track of the conveyance system.

DESCRIPTION OF THE DRAWINGS

Illustrative embodiments are described in detail below with reference to the attached drawing figures, and wherein.

DETAILED DESCRIPTION

The subject matter of select exemplary embodiments is described with specificity herein to meet statutory requirements. But the description itself is not intended to necessarily limit the scope of claims. Rather, the claimed subject matter might be embodied in other ways to include different components, steps, or combinations thereof similar to the ones described in this document, in conjunction with other present or future technologies. Terms should not be interpreted as implying any particular order among or between various steps herein disclosed unless and except when the order of individual steps is explicitly described. The terms "about" or "approximately" or "substantially" as used herein denote deviations from the exact value by +/−10%, preferably by +/−5% and/or deviations in the form of changes that are insignificant to the function.

Figure 1:
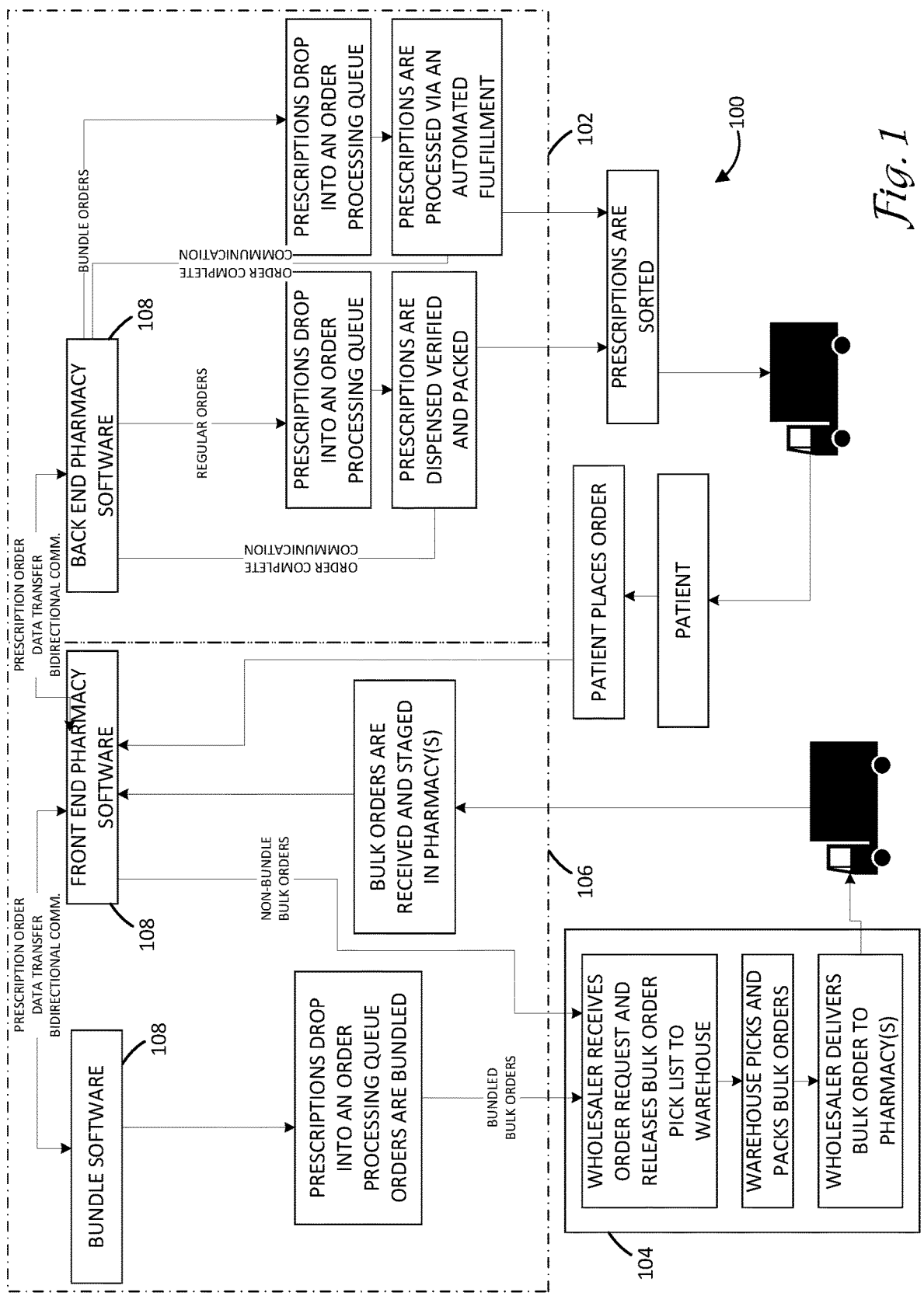
FIG. 1 is a block diagram of an order-fulfillment and product-handling system depicted in accordance with an exemplary embodiment.
Figure 2:
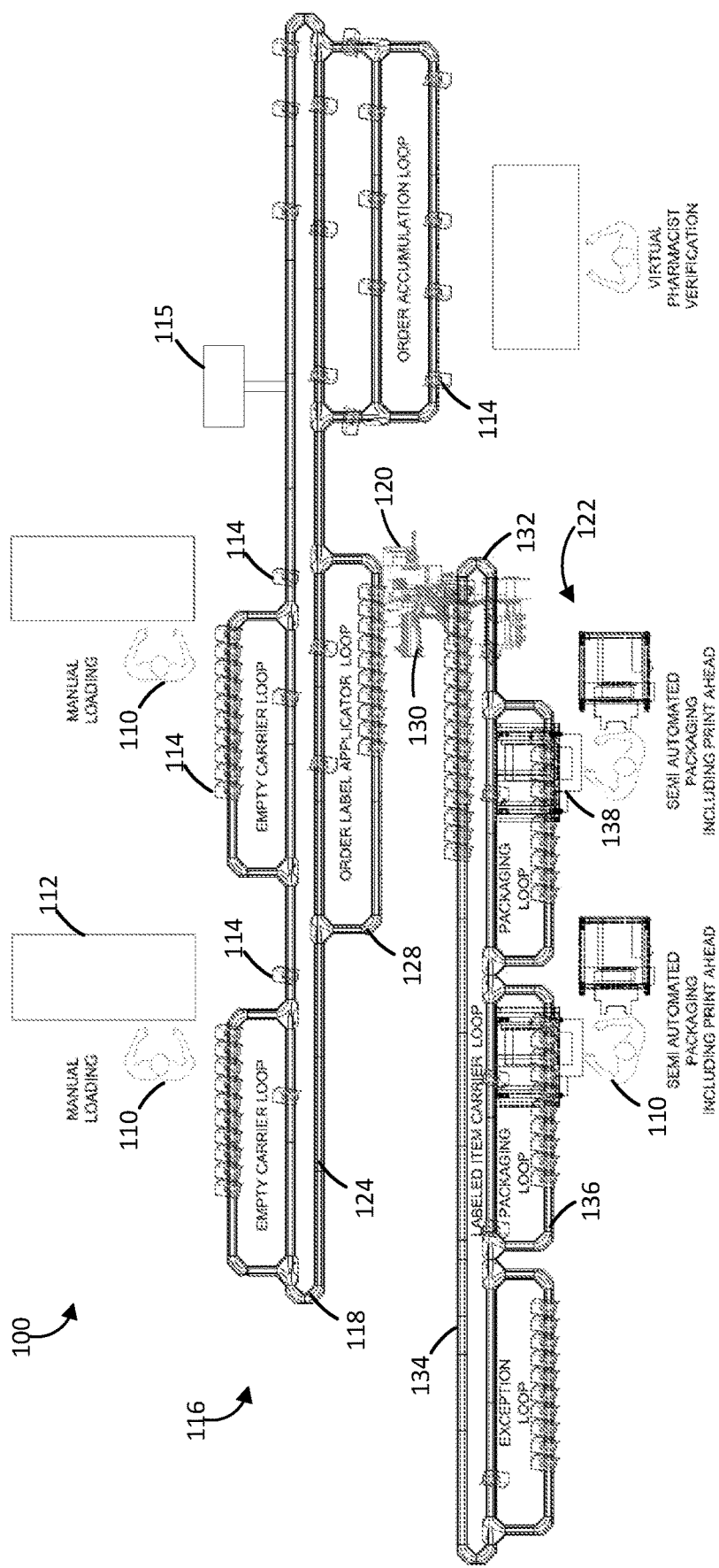
FIG. 2 is a schematic diagram of a product-handling system depicted in accordance with an exemplary embodiment.
Figure 3:
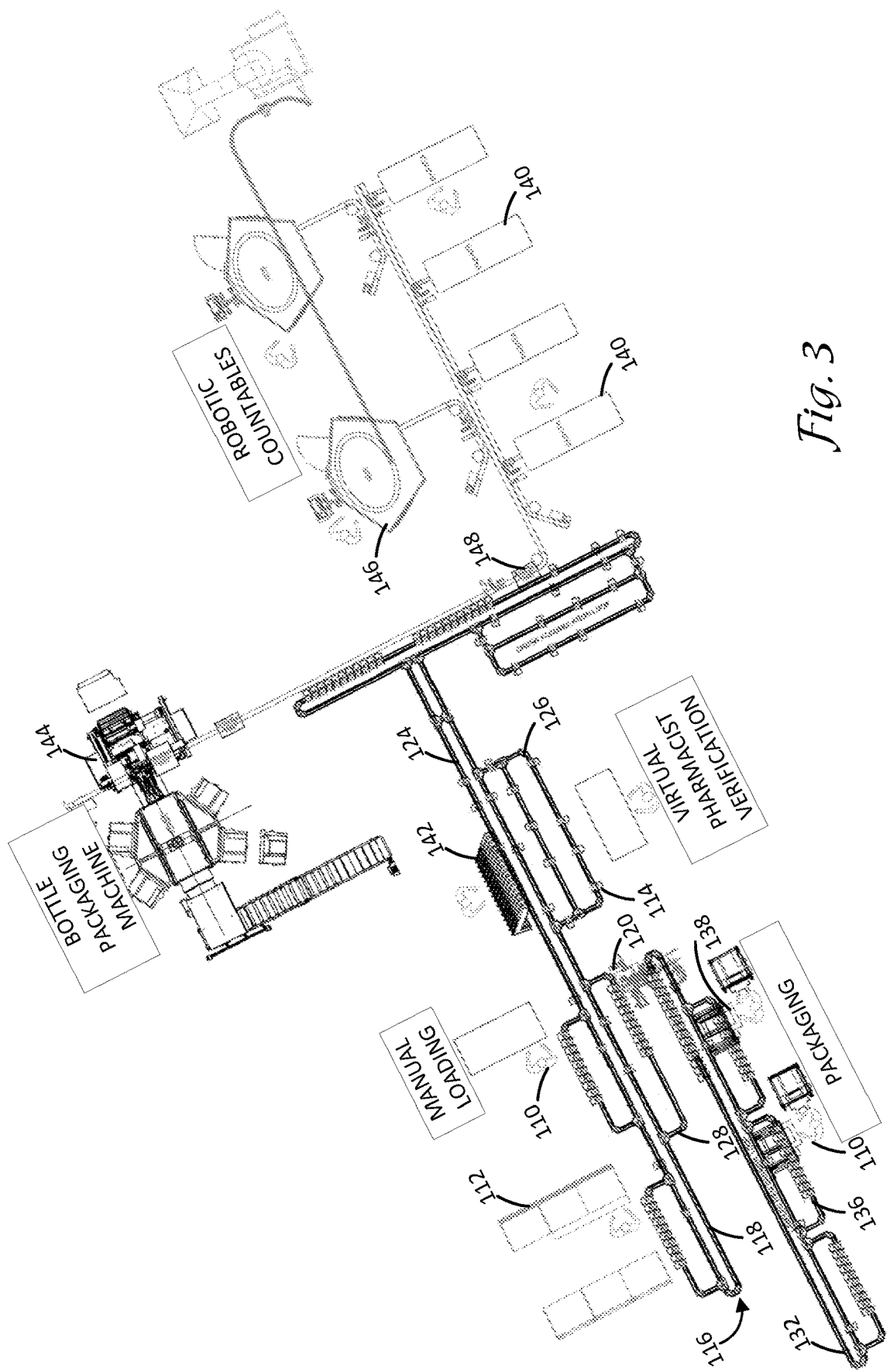
FIG. 3 is a schematic diagram of the product-handling system of FIG. 2 incorporated into a larger product-handling system to receive products from a variety of induction means depicted in accordance with an exemplary embodiment.

With reference to FIGS. 1-3, an order-fulfillment and product-handling system 100 is described in accordance with an exemplary embodiment. The system 100 is described herein with respect to a pharmacy 102 and a wholesaler 104 or other supplier of the pharmacy 102, however it is understood that the system 100 may be employed in a variety of supply chains and a with a variety of products that may or may not be associated with prescription and non-prescription pharmaceuticals, drugs, medications, health products, or the like. The pharmacy 102 is generally discussed herein as a back-end pharmacy or one that is involved with distribution to a large population of customers or patients, such as a large internet-based pharmaceutical retailer in contrast to a smaller, local, brick-and-mortar, front-end pharmacy 106 which has a much smaller distribution. The pharmacy 102 may also receive and fill orders for such front-end pharmacies 106. It is understood however, that embodiments may be scaled to accommodate both large and smaller scale operations and both of which are within the scope of embodiments described herein.

The wholesaler 104 comprises an entity that purchases large quantities and varieties of products from a number of manufacturers and stores and distributes those items to a plurality of pharmacies 102, 106. In some embodiments, the wholesaler 104 may comprise a manufacturer of one or more of the products.

With continued reference to FIG. 1, the system 100 includes one or more software applications 108 executing and residing on computing systems of the pharmacy 102 and wholesaler 104. The computing systems may comprise a computing device 10 and a computing environment 12 like that depicted in FIG. 4 and described more fully below. Multiple instances of the application 108 may execute and/or reside on the computing systems of the pharmacy 102 and the wholesaler 104 which are communicatively coupled. Alternatively, different or unique applications 108 may be implemented at each of the pharmacy 102 and the wholesaler 104, but the applications 108 are configured to communicate order data therebetween, among other data elements that may be desired.

The application 108 is configured to receive a plurality of product orders at the pharmacy 102 or 106 either from customers of the pharmacy 102/106 or from other order compiling software used by the pharmacy 102/106. From the product orders the application 108 identifies bundle-order products and bulk-order products. Bundle-order products include products that can be grouped together based on, for example, groupings thereof that are associated with specific orders from patients that are received by the pharmacy. Bundle-order products may also include high-turn-over products that are ordered very often by many customers and that commonly do not remain in stock at the pharmacy 102/106 for long or even short periods of time, for example such products may be forecasted to be ordered by patients by the time the pharmacy 102/106 receives the products from the wholesaler 104. Bundle-order product designations might also be based on capabilities of the wholesaler 104 to use existing capabilities to combine such products in a single carton, shipping container, palate, or the like.

Bulk-order products may include products ordered by the pharmacy for stocking or based on forecasted needs and not associated with a particular patient order. These products may also include products that require further handling or packaging or repackaging by the pharmacy 102/106 such as non-unit-of-use items like liquids, pills, capsules, or the like that must be dispensed into smaller, individual, unit-of-use-type containers prior to sale or shipment to a patient or customer.

Products handled by the system 100 may be referred to herein as unit-of-use and non-unit of use products. Unit-of-use products include those that are provided in a consumer-ready form. In many instances, unit-of-use products include one or more items that have been placed inside a container such as a carton or box that is labeled for commercial sale. For example, prescription or over-the-counter medications may be provided in one or more blister-packs that are inserted into a box that is labeled with identifying indicia on one or more sides thereof. The identifying indicia may include any information associated with the product such as a name, usage information, promotional information, barcodes, QR codes, production lot numbers, expiration dates, nutritional information, and drug codes among other information that may be desired by a manufacturer or required by law.

Non-unit-of-use products comprise products that must be packaged prior to induction into the conveyance system 118 of the product dispensing system 100. Such products may include, for example in the instance of pharmaceutical products, oral solids, solutions, or other medicinal liquids, gels, suspensions, pills, capsules, tablets, or the like that are dispensed from bulk containers into vials or similar containers as needed.

With continued reference to FIG. 1, an order for the bundle-order products is communicated from the pharmacy 102/106 to the wholesaler 104. The order may also include requests for bulk-order products, but a designation is provided that differentiates between the product sets. The wholesaler 104 retrieves the bundle-order products from stock, packages the products in a shipping carton and labels the carton with an indicia associated with the contents thereof. The wholesaler 104 may label one or more of the products with indicia associate with the product and/or the associated order. The indicia placed on the shipping carton is also associated with the order and is preferably a scan-nable indicia that may be used to retrieve information associated with the order and the contents of the shipping carton. In one embodiment, the indicia comprises a bar code or a quick-retrieval (QR) code but may also comprise another form of indicia including radio-frequency identification tags (RFID tags), holograms, text, or the like.

The shipping carton or cartons of bundle-order products may thus contain a plurality of products or groups of products that are associated by orders received by the pharmacy 102/106 from patients. For example, where a plurality of patients order both drug X and drug Y along with one or more other of the same or different drugs, quantities of drugs X and Y may be bundled by the wholesaler into a single shipping carton or shipping package or multiple associated shipping cartons, i.e. multiple boxes disposed on a single palate or multiple items contained within a single shipment.

The bundle-order products are shipped to the pharmacy 102/106; bulk-order products may also be shipped and are handled and processed at the pharmacy 102/106 to place the items into inventory. As depicted in FIG. 2, the shipping cartons of bundle-order products are received at the pharmacy 102/106 and are provided to operators 110 at manual loading workstations 112. In some embodiments, the bundle order products may be provided to automated means, such as robotic apparatus. The operators 110 may scan the indicia on each respective shipping carton for verification of the contents with the order. The operators 110 remove each of the bundle-order products from their shipping carton and identify the product with the system 100 via the application 108. The bundle-order products may be identified with the system 100 in a variety of ways which preferably include reading or scanning a barcode or other indicia on the packaging of the bundle-order product.

The operators 110 also marry the particular product with a carrier 114 of a product-handling system 116, such as by scanning an indicia on the carrier 114 or by placing the bundle-order product on a particular, designated, empty carrier 114.

The product-handling system 116 is configured to provide independent control, movement, and tracking of each carrier 114 and thus of each bundle-order product disposed thereon. In a preferred embodiment, the product-handling system 116 is configured like that described in U.S. patent application Ser. No. 16/839,904 filed Apr. 3, 2020 (the '904 application); the disclosure of the '904 application is hereby incorporated herein in its entirety by reference. It is understood however that other configurations may be employed without departing from the scope of embodiments described herein. As depicted in FIG. 2, the product-handling system 116 preferably includes a conveyor or conveyance system 118, a labeling system 120, and a packaging system 122. A broad overview of these systems 118, 120, and 122 follows. Additional details of such systems may be found in the '904 application.

The conveyance system 118 preferably comprises a linear synchronous motor technology in which a plurality of pucks or carriers 114 are independently moveable, identifiable, and traceable along a track 124. Each of the carriers 114 may include a V-block coupled thereon. The V-block comprises a side plate and a base plate joined along a shared edge and oriented generally orthogonally to one another. An actuatable product stop is provided at a trailing end of the V-block to selectively retain a product unit on the V-block. The V-block is oriented such that the product unit is naturally automatically aligned and abutted against the side plate and the product stop of the V-block by gravity.

The carriers 114 of the conveyance system are moveable by a controller 115 such as a computer program controller, along the track 124. The track 124 may include one or more staging loops such as order accumulation loops 126 and label-applicator loops 128 into which the carriers 114 may be diverted and/or retrieved to enable the controller 115 to appropriately sequence the carriers 114 into a desired order for labeling and/or packaging.

The labeling system 120 is located along the track 124 of the conveyance system 118 and includes an escapement, a plurality of sensors, and a labeling module 130. The escapement is configured similarly to the V-block to receive the product unit from the V-block via gravity and to preserve the orientation of the product unit. The sensors, which may include cameras, infrared scanners, radio-frequency identification scanners, or the like, are configured to scan and read the identifying indicia on the product units and may record images of the product unit while the product unit is retained on the escapement. The controller 115 validates the scanned indicia with respect to a selected order and instructs the labeling module 130 to prepare and apply a label associated with the order. Retention of the product unit on the escapement provides a known and constant orientation and position of the product unit relative to the labeling module without need for additional positioning apparatus. The labeling module may thus be configured based on a constant label application location (in at least one plane) across a variety of product units to be labeled independent of the length or width or shape of the product units.

Following validation and labeling by the labeling system 120, the product units may be released from the escapement by actuation of a stop plate on a distal end of the escapement to allow the product units to slide via gravity onto another similarly configured carrier 114 and/or V-block disposed on a second track 132 associated with the packaging-handling system 116 or retained in their respective V-blocks and transported directly to the packaging system. The second track 132 may include a labeled item carrier loop 134 and may include one or more packaging loops 136 which may be employed to accumulate, group, and stage the carriers 114 and the product units thereon in order to aid packaging.

The packaging system 122 may comprise a variety of bagging or boxing apparatus 138 configured to receive and accumulate product units associated with a particular patient order into a single package, verify the product units deposited into the package relative to an order, label the package for shipping, and/or seal the package. The packaging system may also print and deposit any necessary documentation associated with an order or product units included in the order into the package prior to sealing. The sealed package can then be transported by known means to a desired location for shipping.

Accordingly, bundle-order products may be inducted into the product-handling system 116, accumulated with other products based on patient orders for those products, labeled, and packaged for shipment or other transfer to the patient without being placed into an inventory or stock at the pharmacy 102. Personnel, infrastructure, and product-handling apparatus requirements are thus reduced or eliminated. Additionally, risks for the pharmacy 102 associated with retaining products in stock for long periods of time and waste of such products that expire while in stock, among other risks, may be reduced or eliminated. The accuracy of disposing the correct products in the correct packages may also be increased through the marrying of the products with their respective carriers 114, validation of the products and labeling thereof by the labeling module 130, and verification by the packaging system 122.

As depicted in FIG. 3, the product-handling system 116 is configured for simple scalability by incorporating additional linear dispensing units to accommodate additional product units. The conveyance system 118 is further configurable or expandable to provide additional carriers 114 and/or tracks 124/132 to accommodate additional labeling systems, packaging systems, and product dispensing systems as needed to accommodate the volume of product units handled by the system 100. For example, one or more manual dispensing stations 140 may be provided in which operators 110 manually retrieve a product unit from a storage location and place the product unit on a carrier for handling by the system. In doing so, the operator 110 also scans identifying indicia on the product unit and on the selected carrier 114 to marry the product unit with the carrier 114. Because each carrier 114 is loaded with a known product unit that is married to the carrier 114 and the carrier 114 is identifiable and independently moveable by the control system, manually populated carriers may be easily intermixed and aggregated with automatically populated carriers within the product dispensing system.

Similarly, product units may be inducted into the product-handling system 116 from bulk-product processing units and/or existing product handling apparatus. For example, bulk unit-of-use products may be dispensed from linear-dispensing units 142 disposed along the track 124 and configured to dispense unit-of-use products onto the carriers 114 similarly to that described in the '904 application. Non-unit-of-use products might also be inducted from liquid dispensing and bottling apparatus 144, or robotic counting and packaging apparatus 146 which may dispense quantities of bulk products into containers that may then be disposed on a carrier 114.

In some embodiments, the product-handling system 116 and/or the conveyance system 116 may be added to existing systems (or vice versa) that employ different conveyance system technologies, such as a conveyor belt system or bin handling system. In such instances, a transfer component 148 may be employed to transfer product units from the existing system onto carriers 114 of the conveyance system 116. The transfer component 148 may also marry the product unit with the respective carrier 114.

Figure 4:
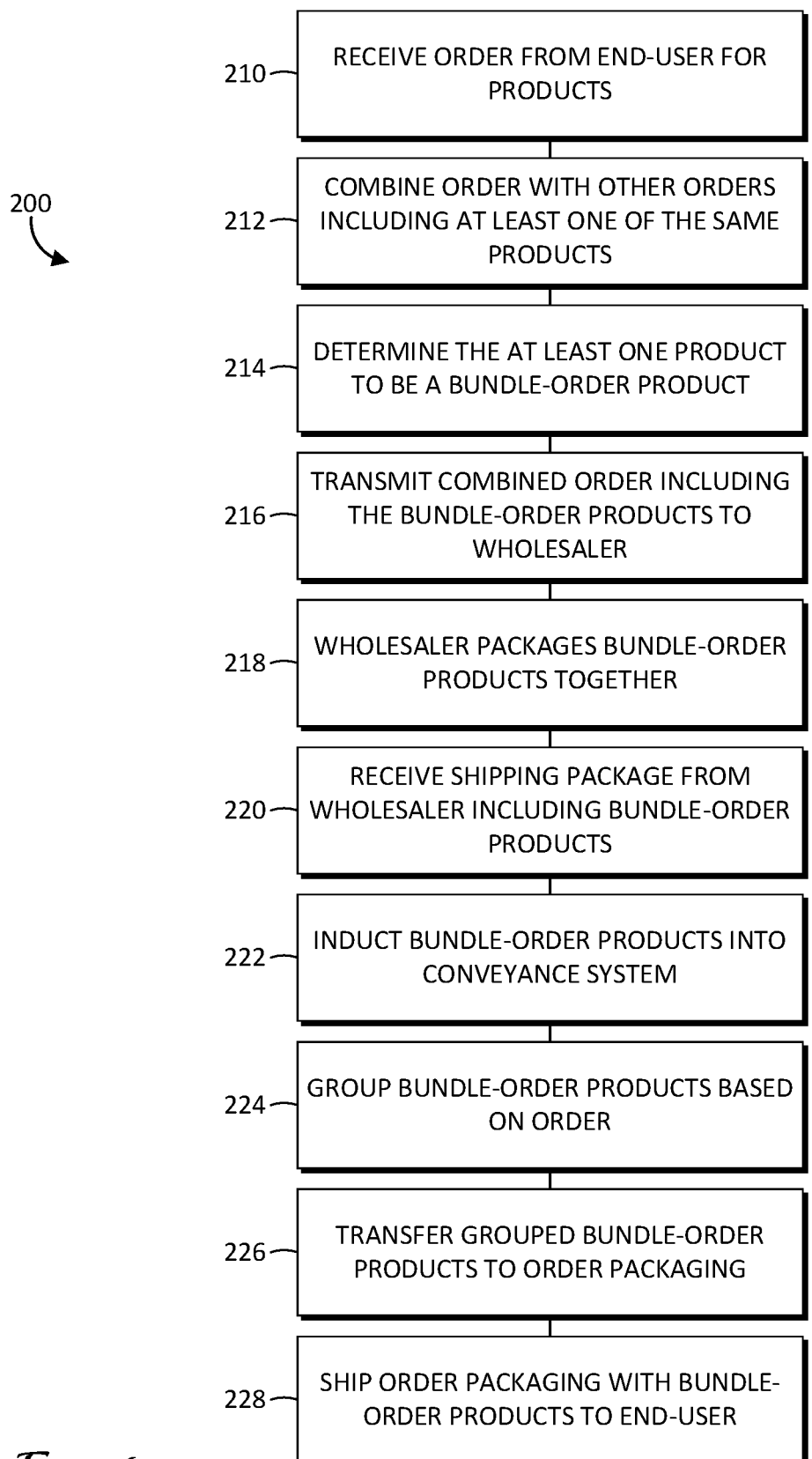
FIG. 4 is a flow diagram depicting a method for product handling depicted in accordance with an exemplary embodiment.

Referring now to FIG. 4, and method 200 for product handling is described in accordance with an exemplary embodiment. At step 210 an order for one or more products is received from an end-user, such as a patient, by a pharmacy or other retailer. The order is combined with a plurality of other orders, at step 212. The other orders preferably overlap with one another, in that they each include one or more products that are the same as those ordered in one or more of the other orders. The ordered products may completely overlap, i.e. be the same across all of the orders, or the ordered products may only partially overlap or may be some combination thereof.

As discussed previously, the overlapping products comprising unit-of-use products may be designated or referred to as bundle-order products, at step 214 and a combined order for the bundle-order products may be transmitted to a wholesaler or distributor. The combined order may include bundle-order and non-bundle-order products, but the products are preferably identified as such in the order. In another embodiment, the wholesaler may receive the combined order and may determine which products are bundle-order products based on the wholesaler's capabilities and/or inventory.

At step 218 the wholesaler packages the bundle-order products together in a shipping package which may comprise a single carton, a palate with multiple cartons thereon, a truckload, or another grouping of products configured for shipment to the pharmacy. One or more bulk-order or other non-bundle-order products may be shipped with the shipping package but are designated as such for separate processing by the pharmacy.

The pharmacy receives the shipping package at step 220 and the bundle-order products are removed from the shipping package and inducted directly into the conveyance system at one or more induction stations at step 222. It is understood, especially with large shipping packages, that the shipping package may be broken down at the receiving pharmacy facility into a number of component parts that are then moved to the induction stations. However, the shipping packages and their component parts and not broken down into individual products or items and are not placed into a stock or inventory location at the pharmacy facility; the bundle-order products contained therein are moved directly to the conveyance system for fulfillment of the orders that have already been received for those products.

Induction of the bundle-order products into the conveyance system may be at random, e.g. the bundle-order products need not be ordered or grouped with other products form a particular patient/end-user order prior to induction. Once in the conveyance system, a controller routes the carriers carrying the bundle-order products through one or more carrier loops to group the carriers and products based on the orders as depicted at step 224. Such grouping may include grouping of non-bundle order products with the bundle-order products. The non-bundle order products may be inducted into the system separately from the induction stations, from another conveyance system, or from another form of induction means, but may then be intermingled with the bundle-order products as needed to fulfill the orders.

Each of the products, bundle-order, bulk-order, or otherwise, may be labeled as they are moved about the conveyance system via a labeling station. Because each of the carriers is independently identifiable and traceable by the controller, the products need not be grouped prior to labeling.

The grouped products are moved to a packaging station where the products may exit the conveyance system via an escapement and be placed into an order packaging as depicted at step 226. The order packaging comprises a poly-bubble bag, carton, or another available form of packaging sufficient to contain the products for shipment via standard mail or similar shipping means. The order packaging might alternatively comprise a tote that can be transported to another system for packaging and shipment as needed. The order packaging, with the products disposed therein are shipped to the patient/end-user at step 228.

Figure 5:
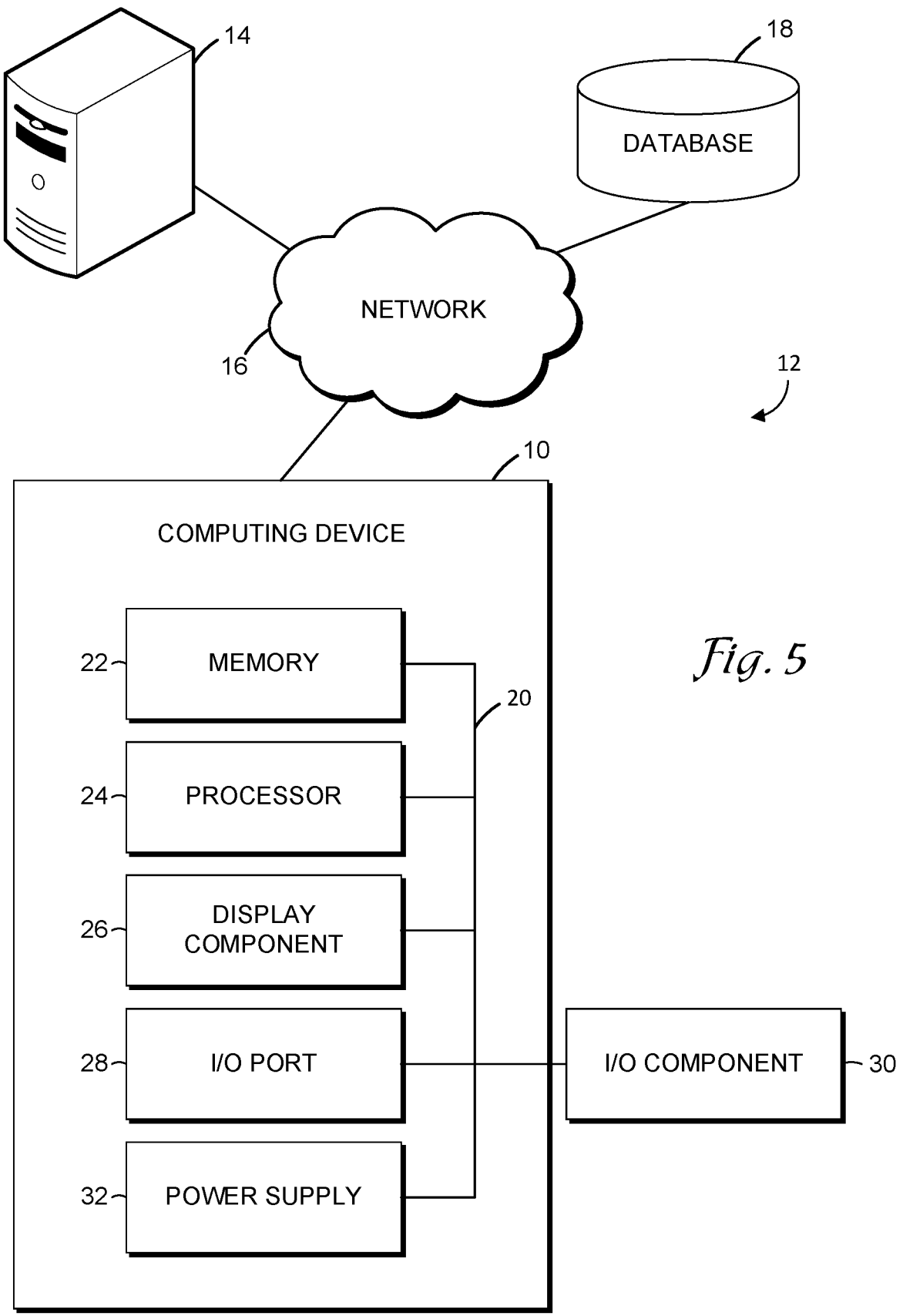
FIG. 5 is a diagram of an exemplary computing environment and computing device suitable for use in exemplary embodiments.

With reference to FIG. 5, an exemplary computing device 10 for implementing embodiments of the invention is shown in accordance with an exemplary embodiment. The computing device 10 is but one example of a suitable computing device and is not intended to suggest any limitation as to the scope of use or functionality of exemplary embodiments. The computing device 10 should not be interpreted as having any dependency or requirement relating to any one or combination of components illustrated. The computing device 10 is depicted within an exemplary operating environment 12 in which the computing device 10 may be disposed in a networked configuration. Although many components of the operating environment 12 and the computing device 10 are not shown or described herein, it is appreciated that such components and their interconnection are well known. Accordingly, additional details concerning the construction of the operating environment 12 and the computing device 10 are not further disclosed herein.

Exemplary embodiments may be practiced in a variety of system configurations, including hand-held devices, consumer electronics, general-purpose computers, specialty computing devices, and the like. The computing device 10 is inclusive of devices referred to as workstations, servers, desktops, laptops, hand-held device, and the like as all are contemplated within the scope of FIG. 5 and in references to the computing device 10.

Exemplary embodiments may be practiced by a stand-alone computing device as depicted in FIG. 5 and/or in distributed computing environments where one or more tasks are performed by remote-computing devices 14 that are linked through a communications network 16. The remote-computing devices 14 comprise one or more computing devices that may be configured like the computing device 10.

An exemplary computer network 16 may include, without limitation, local area networks (LANs) and/or wide area networks (WANs). Such networking environments are commonplace in offices, enterprise-wide computer networks, intranets and the Internet. When utilized in a WAN networking environment, the computing device 10 may include a modem or other means for establishing communications over a WAN, such as the Internet. In a networked environment, program modules or portions thereof may be stored in association with the computing device 10, a database 18, or one or more remote-computing devices 14. For example, and not limitation, various application programs may reside on memory associated with any one or more of the remote-computing devices 14. It will be appreciated that the network connections shown are exemplary and other means of establishing a communications link between the computers (e.g., the computing device 10 and the remote-computing devices 14) may be utilized.

Exemplary embodiments may be described in the general context of computer code or machine-useable instructions, including computer-executable instructions, such as program modules being executed by a computer or other machine, like a smartphone, tablet computer, or other device. Generally, program modules including routines, programs, objects, components, data structures, or the like, refers to code that performs particular tasks or implements particular abstract data types.

With continued reference to FIG. 5, the computing device 10 includes one or more system busses 20, such as an address bus, a peripheral bus, a local bus, a data bus, or the like, that directly or indirectly couple components of the computing device 10. The bus 20 may comprise, for example, an Industry Standard Architecture (ISA) bus, Micro Channel Architecture (MCA) bus, Enhanced ISA (EISA) bus, Video Electronic Standards Association (VESA) local bus, a Peripheral Component Interconnect (PCI) bus, among other bus architectures available in the art.

The bus 20 couples components like internal memories 22, processors 24, display components 26, input/output (I/O) ports 28 and I/O components 30 coupled thereto, and a power supply 32. Such components may be provided singly, in multiples, or not at all as desired in a particular configuration of the computing device 10. As indicated previously, additional components might also be included in the computing device 10 but are not shown or described herein so as not to obscure exemplary embodiments. Such components are understood as being within the scope of embodiments described herein.

The memory 22 of the computing device 10 typically comprises a variety of non-transitory computer-readable media in the form of volatile and/or nonvolatile memory that may be removable, non-removable, or a combination thereof. Computer-readable media include computer-storage media and computer-storage devices and are mutually exclusive of communication media, e.g. carrier waves, signals, and the like. By way of example, and not limitation, computer-readable media may comprise Random Access Memory (RAM); Read-Only Memory (ROM); Electronically Erasable Programmable Read-Only Memory (EEPROM); flash memory or other memory technologies; compact disc read-only memory (CDROM), digital versatile disks (DVD) or other optical or holographic media; magnetic cassettes, magnetic tape, magnetic disk storage or other magnetic storage devices, or any other medium that can be used to encode desired information and be accessed by the computing device 10.

The processor 24 reads data from various entities such as the memory 22 or the I/O components 30 and carries out instructions embodied thereon or provided thereby.

The display component 26 presents data indications to a user or other device. Exemplary presentation components include a display device, a monitor, a speaker, a printing component, a vibrating component, or other component that produces an output that is recognizable by a user.

The I/O ports 28 allow the computing device 10 to be logically coupled to other devices including the I/O components 30, some of which may be built in. Illustrative components include a microphone, joystick, game pad, satellite dish, scanner, printer, or wireless device, among others.

Many different arrangements of the various components depicted, as well as components not shown, are possible without departing from the scope of the claims below. Embodiments of the technology have been described with the intent to be illustrative rather than restrictive. Alternative embodiments will become apparent to readers of this disclosure after and because of reading it. Alternative means of implementing the aforementioned can be completed without departing from the scope of the claims below. Identification of structures as being configured to perform a particular function in this disclosure and in the claims below is intended to be inclusive of structures and arrangements or designs thereof that are within the scope of this disclosure and readily identifiable by one of skill in the art and that can perform the particular function in a similar way. Certain features and sub-combinations are of utility and may be employed without reference to other features and sub-combinations and are contemplated within the scope of the claims.

What is claimed is:

1. A product conveyance system comprising: a plurality of bundle-order products disposed in a shipping packaging, the plurality of bundle-order products having been placed in the shipping packaging by a distributor prior to shipping, the plurality of bundle-order products being associated with a plurality of orders from end-users, each order of the plurality of orders being associated with one or more of the plurality of bundle-order products;
   a conveyor having a track and a plurality of product carriers, each product carrier configured to carry one of the bundle-order products and being independently traceable and moveable along the track;
   an induction station located along the track at which the plurality of bundle-order products is received in the shipping packaging, each of the plurality of bundle-order products being removed from the shipping packaging at the induction station and each being disposed directly onto and associated with a respective one of the plurality of product carriers;
   a carrier loop in the track into which one or more of the plurality of product carriers is moveable to group carriers carrying bundle-order products associated with a particular one of the plurality of customer orders together along the track; and
   a packaging station disposed along the track and having an escapement via which the bundle-order products associated with the particular one of the plurality of orders are removed from their respective carriers and disposed into an order packaging for shipment to the end-user.

2. The product conveyance system of claim 1, wherein the plurality of bundle-order products is never removed from the shipping packaging and placed into stock prior to being received at the induction station.

3. The product conveyance system of claim 1, further comprising:
   an order-label applicator station disposed along the track and configured to apply a label to each of the bundle-order products, the label including indicia that is representative of the order associated with the bundle-order products.

4. The product conveyance system of claim 1, wherein the bundle-order products comprise unit-of-use products.

5. The product conveyance system of claim 1, further comprising:
   a transfer component disposed along the track, the transfer component receiving a bulk-order product from a second conveyor system and inducting the bulk-order product onto an empty carrier of the plurality of carriers, the bulk-order product being associated with one of the orders.

6. The product conveyance system of claim 5, wherein the bulk-order product is moved along the track and is grouped with bundle-order products associated with the order via the carrier loop.

7. The product conveyance system of claim 5, wherein the bulk-order product comprises a non-unit-of-use product.

8. The product conveyance system of claim 1, wherein the conveyance system includes a controller configured to track a location and identity of each carrier and products carried thereby and to move the carriers along the track.

9. A method for product handling comprising:
receiving an order from an end-user for a plurality of products;
combining the order with a plurality of other orders from other end-users that include at least one of the plurality of products, the at least one of the plurality of products comprising a bundle-order product;
transmitting a combined order including the order and the plurality of other orders to a distributor;
receiving a shipping package from the distributor, the shipping package including a number of the bundle-order products sufficient to fulfill requirements for the bundle-order products in the combined order;
inducting the bundle-order products from the shipping package into a conveyance system, each of the bundle-order products being disposed on a respective carrier that is independently moveable and traceable along a track of the conveyance system;
grouping, via the conveyance system, one or more of the bundle-order products together based on the order for the plurality of products; and
transferring the one or more bundle-order products for the order into an order packaging via an escapement disposed along the track of the conveyance system.

10. The method of claim 9, wherein the order for the plurality of products includes only bundle-order products.

11. The method of claim 9, wherein the order for the plurality of products includes one or more bundle-order products and one or more bulk-order products and wherein the bulk-order products comprise products that are ordered from a distributor and are not associated with an order received from an end-user.

12. The method of claim 11, wherein the bulk-order products are retrieved from a storage location prior to induction onto the conveyance system.

13. The method of claim 11, further comprising:
a transfer station configured to transfer bulk-order products from a second conveyance system onto respective ones of the carriers of the plurality of carriers.

14. The method of claim 13, wherein bulk-order products comprise non-unit-of-use products and the second conveyance system packages the non-unit-of-use products into unit-of-use containers that can be carried by the carriers.

15. The method of claim 9, further comprising:
labeling the bundle-order products via a labeling station disposed along the track, the labeling station applying an indicia onto the bundle-order products, the indicia identifying the order associated with the particular bundle-order product.

16. The method of claim 9, wherein the track of the conveyance system includes a carrier loop into which one or more of the plurality of product carriers is moveable to group carriers carrying the bundle-order products associated with the order together along the track.

17. The method of claim 16, wherein the grouped carriers are moved to the escapement as a group to transfer their respective bundle-order products into the order packaging.

18. A method for receiving and packaging pharmaceuticals, the method comprising:
receiving an order at a pharmacy from a patient for a plurality of products, at least one of the products being a unit-of-use product;
combining the order with a plurality of other orders from other patients of the pharmacy that include the unit-of-use product, now a bundle-order product;
transmitting a combined order including the order and the plurality of other orders to a distributor, the combined order including the bundle-order product;
receiving a shipping package from the distributor, the shipping package including a number of the bundle-order products sufficient to fulfill requirements for the bundle-order products in the combined order;
inducting the bundle-order products from the shipping package into a conveyance system, each of the bundle-order products being disposed on a respective carrier that is independently moveable and traceable along a track of the conveyance system;
grouping, via one or more carrier loops in the conveyance system, one or more bundle-order products together based on the order for the plurality of products; and
transferring the one or more bundle-order products for the order into an order packaging via an escapement disposed along the track of the conveyance system.

19. The method of claim 18, wherein the order from the patient includes a non-unit-of-use product and the combined order includes an order for one or more bulk-order products which comprise the non-unit-of-use product,
wherein the conveyance system includes a transfer station configured to transfer bulk-order products from a second conveyance system onto the carriers of the conveyance system, and
wherein grouping, via one or more carrier loops in the conveyance system, the one or more bundle-order products together based on the order for the plurality of products includes grouping the bulk-order products with the bundle-order products based on the order for the plurality of products.

20. The method of claim 18, further comprising:
labeling the bundle-order products via a labeling station disposed along the track, the labeling station applying an indicia onto the bundle-order products, the indicia identifying the order associated with the particular bundle-order product.

* * * * *